United States Patent [19]
Boucher, Jr.

[11] Patent Number: 5,953,849
[45] Date of Patent: Sep. 21, 1999

[54] FISHING LURE

[76] Inventor: John C. Boucher, Jr., 10609 Wisper Willow, Woodlands, Tex. 77380

[21] Appl. No.: 08/427,743

[22] Filed: Apr. 24, 1995

[51] Int. Cl.[6] .................................................. A01K 85/00
[52] U.S. Cl. ........................ 43/42.24; 43/42.08; 43/42.39
[58] Field of Search ................................ 43/42.08, 42.24, 43/42.31, 42.39, 44.83

[56] References Cited

U.S. PATENT DOCUMENTS

| | | | |
|---|---|---|---|
| 2,644,265 | 7/1953 | Stettner | 43/42.39 |
| 2,659,175 | 11/1953 | Carpenter | 43/42.08 |
| 2,742,729 | 4/1956 | McVay | 43/42.39 |
| 3,225,484 | 12/1965 | Richard | 43/42.39 |
| 3,988,851 | 11/1976 | Sacharnoski | 43/42.31 |
| 4,163,337 | 8/1979 | Kress | 43/42.05 |
| 4,345,399 | 8/1982 | Guzik | 43/42.31 |
| 4,785,569 | 11/1988 | Thomas | 43/42.31 |
| 4,791,749 | 12/1988 | Stazo | 43/42.39 |
| 4,920,686 | 5/1990 | McGahee | 43/42.24 |
| 4,953,319 | 9/1990 | Kasper | 43/42.24 |
| 5,090,151 | 2/1992 | Salminen | 43/42.08 |

FOREIGN PATENT DOCUMENTS

| | | | |
|---|---|---|---|
| 1148408 | 12/1957 | France | 43/42.08 |
| 2007462 | 5/1992 | WIPO | 43/42.08 |

*Primary Examiner*—Kurt Rowan
*Attorney, Agent, or Firm*—Charles M. Kaplan

[57] ABSTRACT

A soft, flexible plastic fishing lure body portion has a cavity into which a removable weight is inserted so that the lure will have a swimming or crank-bait type of action when it is reeled in. The weight and other parts of the lure rigging may be removed from the original lure body portion and reused with other lure bodies if the soft lure body portion becomes damaged or worn out, or when a fisherman wants to change the size, color, shape or action of the lure he is using.

20 Claims, 4 Drawing Sheets

FISHING LURE

BACKGROUND OF THE INVENTION

This invention relates to fishing tackle, and more particularly to artificial fishing lures. Soft bodied fishing lures have the advantage of feeling more lifelike to game fish than hard bodied fishing lures, so when a game fish strikes a soft bodied lure, the striking fish will hold the soft bodied lure longer in its mouth. This gives the fisherman a longer time to feel the strike and to set the hook. However soft bodied fishing lures ordinarily do not have any built in motion or action that attracts game fish and induces the fish to strike the lure. Such strike inducing motion or action ordinarily must be produced by the way the fisherman manipulates his fishing rod or reel. Many fishermen do not have the skill to consistently manipulate their tackle in a way that gives soft bodied lures such action. Also, soft bodied fishing lures are relatively fragile in that pieces of these lures can be broken off when the lures are snagged and fishes can bite off or otherwise damage these lures. Further, fish attracting scent is sometimes added to the soft material from these lures are made, and such scent eventually is washed out of the lure body by the water in which the lure is used.

OBJECTIVES OF THE INVENTION

Accordingly, it is an objective of this invention to provide improved fishing tackle and lures.

Another object is to provide soft bodied fishing lures with wobbling or swimming action that provokes game fish to strike.

A further object is to provide fishing lures with a body portion that receives a weight and a hook and line rigging that can be removed, saved, and used again in the body portion of a different lure.

A still further object is to provide fishing lure bodies with weights that can be changed to alter the action of the lure.

Another object is to provide crank-bait type fishing lure bodies that can have a weight and a fish hook attached to the lure body without requiring screw eyes or other fasteners that must bite into the lure body itself.

Another object is to enable fishermen to change the depth or action of a fishing lure without having to untie and retie the lure to a fishing line.

Another object is to reduce the amount of waste material that must be discarded when a fish lure body has been broken, becomes worn out, or when embedded scent has been used up.

Another object is to provide a soft bodied fish lure with the automatic wobbling or swimming action of a crank-bait.

A further object is to provide fishing lures with a soft, natural feeling, looking and tasting plastic bodies that can be effectively fished by unskilled fishermen at a variety of depths, which are easy to rig and to change the parts of, which have adjustable actions, are relatively inexpensive, and which do not possess defects found in similar prior art lures.

Other objects and advantages of the fishing lures incorporating this invention will be found in the specification and claims, and the scope of the invention will be set forth in the claims.

DESCRIPTION OF THE INVENTION

Figure 1:
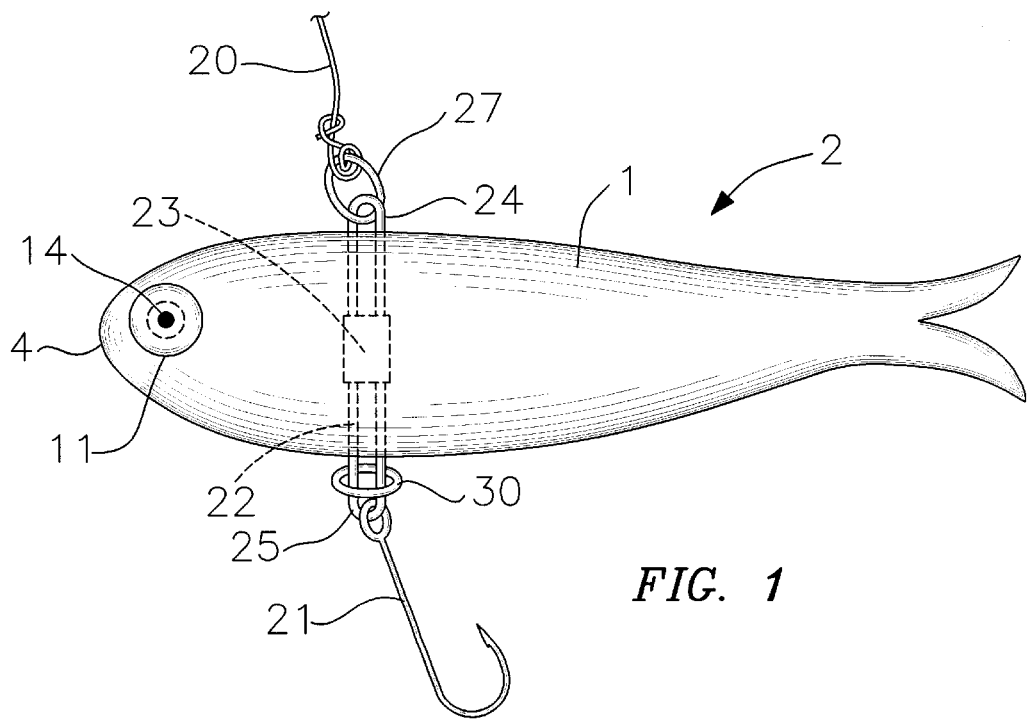
FIG. 1 is a side view of an embodiment of the invention.

The drawing shows fishing lures having having soft plastic bodies, or at least soft body portions, in accord with this invention. In the embodiment of FIGS. 1–7, the soft body 1 of the lure 2 is shaped like a small bait fish, such as a shad. Body 1 has an essentially cylindrical, open ended cavity 3 adjacent its front end 4. A pair of coaxial circular holes 5 of predetermined size pass through the exterior surface 6 of body 1 so as to define openings communicating with the interior of the cavity 3. In this embodiment holes 5 have the same diameter as cavity 3. The central axis 7 of cavity 3 and holes 5 is essentially perpendicular to the central axis 8 of lure body 1.

Figure 2:
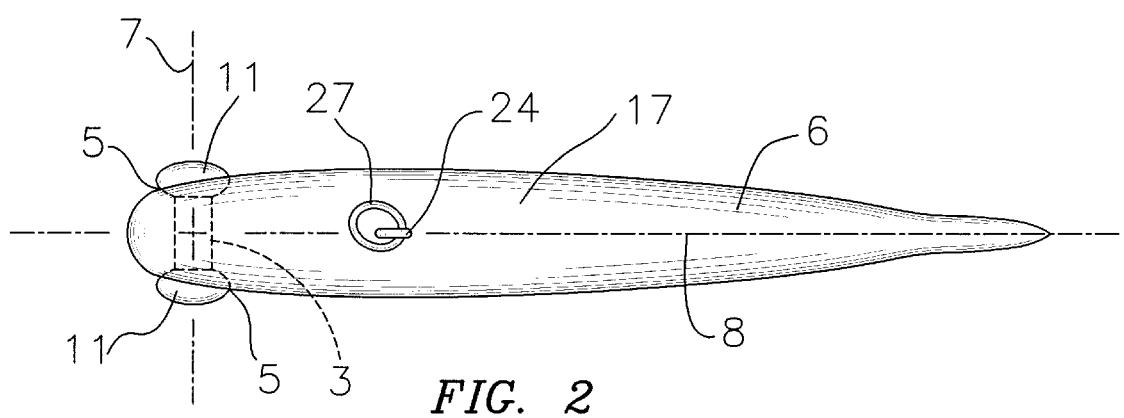
FIG. 2 is a top plan view of the embodiment shown in FIG. 1.
Figure 3:
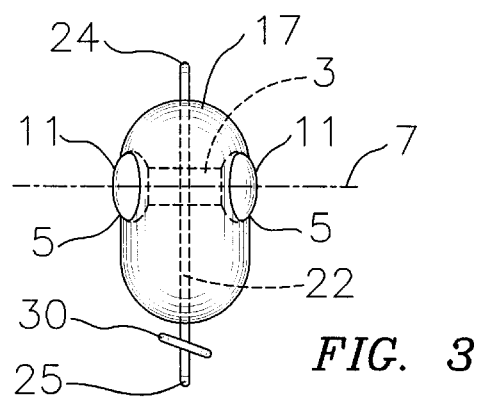
FIG. 3 is a front end view of the embodiment shown in FIG. 1.
Figure 4:
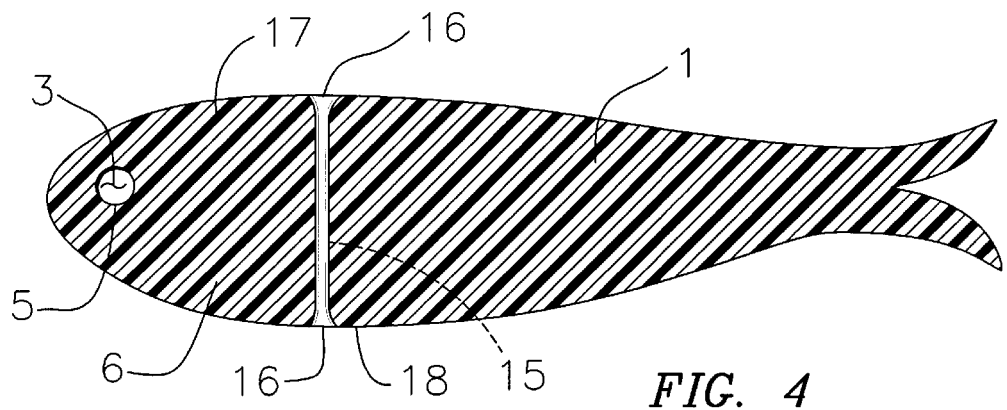
FIG. 4 is a side view of the lure body of the embodiment in FIG. 1.
Figure 5:
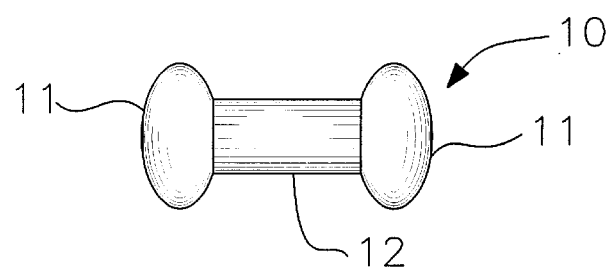
FIG. 5 is an enlarged view of the weight from the embodiment in FIG. 1.

To provide lure 2 with the automatic wobbling or swimming action of a crank bait, weight means should be inserted into cavity 3. In this embodiment the weight means is a dumbbell shaped weight 10 having identical, generally circular, enlarged end knobs 11 and a relatively smaller cylindrical central portion 12. As shown in FIGS. 1–3, one of the knobs 11 has been passed through either one of the holes 5 until such knob has emerged through the hole 5 on the opposite side of lure body 1. To accomplish this, the plastic body material around such hole 5 had to be stretched enough to permit passage of the knob, and then the plastic body material had to return toward approximately its original configuration. This enables the plastic body material to grip weight 10 and to releasably hold most of the weight 10 in cavity 3 within the lure body 1. At least a portion of each enlarged knob 11 remains on the outside of body 1. The portions of knobs 11 that are visible on the outside of body 1 may be colored or otherwise decorated at 14 so that they appear to be the eyes of a bait fish or other aquatic animal. The diameter of the cavity 3 and the holes 5 should be smaller than the diameter of knobs 11 and the diameter of central portion 12. The central axis of weight 10 is coincident with the cavity central axis 7.

Figure 6:
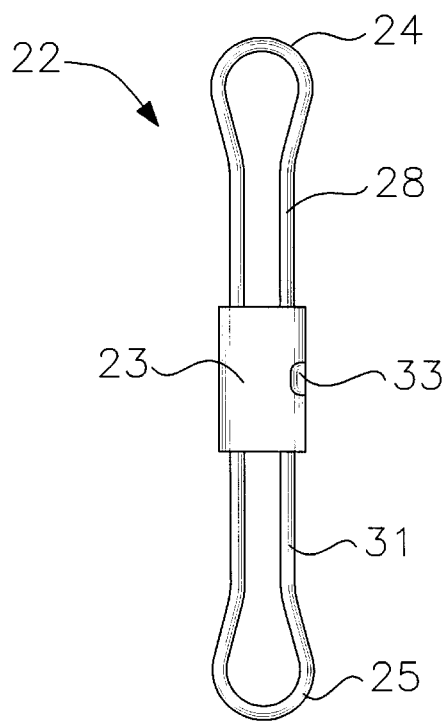
FIG. 6 is an enlarged side view showing the connecting means from the embodiment of FIG. 1 in closed position.
Figure 7:
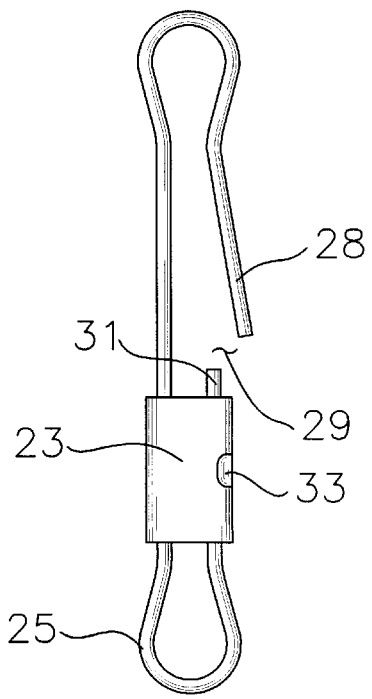
FIG. 7 is an enlarged side view showing the connecting means from the embodiment of FIG. 1 in open position.

A bore 15 extends completely through lure body 1 and has entrance openings 16 at the top and bottom surfaces 17 and 18 of body 1. Any conventional connecting means may occupy bore 15 for attaching the lure to a fishing line 20 and for connecting a fish hook 21 to such a line. As shown in FIGS. 1, 6 and 7, the connecting means may be a hook hanger or clasp 22 having a slidable closure member 23 for opening loops 24 and 25 at its opposite ends. Bore 15 should be smaller than the width of clasp 22 so that insertion of the clasp will stretch the body material around the bore and cause the body 1 to grip the closure member snugly but releasably within the lure bore. A conventional snap or ring 27 may be held in upper loop 24 for attaching lure 2 to a fishing line 20. Another ring 30 may surround clasp 22 adjacent lower loop 25 for preventing the clasp from being pulled through bore 15 if the lure body becomes snagged on an obstruction in the water.

As shown in FIG. 7, the sliding of closure member 23 in one direction releases an arm 28 of the clasp and provides an opening 29 through which the ring 27 may be passed an moved along the arm 28 into the upper loop 24. Sliding the closure member 23 in the opposite direction will close opening 29, as shown in FIG. 6. Continued sliding closure member 23 in such opposite direction will move the closure member 23 out of contact with the other arm 31 of the clasp and again provide opening 29 for impaling another part of the rigging such as the eye of hook 21. Arms 28 and 31 are spring biased toward the open position shown in FIG. 7 so as to firmly hold closure member 23 in place when the clasp 22 is in the closed position shown in FIG. 6. Before closure member 23 can be slid to a position providing opening 29, one of the arms 28 or 31 must be pressed inwardly to enable a detent or indentation 33 on the closure member to slide past the end of such inwardly pressed arm.

Figure 8:
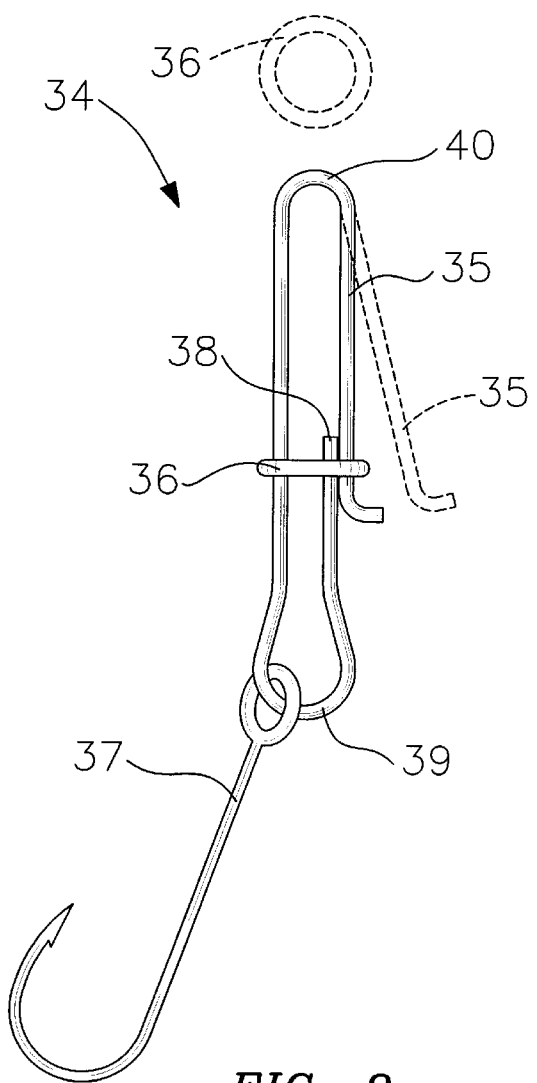
FIG. 8 is a side view of another connecting means in accord with this invention.

FIG. 8 shows another embodiment of a conventional hook hanger clasp 34 that is usable with this invention. Clasp 34 has an arm 35 that is biased toward an open position when a ring 36 is removed (as shown in phantom). When ring 36 has been removed, the eye of a hook 37 can be impaled on a stationary prong 38 and then moved to lower loop 39. The arm 35 then would be moved to its closed position, and the ring 36 would be slid down the arm and prong to close the clasp. The clasp 34 could be passed through bore 15 so that its upper bend 40 protrudes above the lure body upper surface 17 in the same way as does the upper loop 24 of clasp 22. Bend 40 would then provide means for attaching the lure to a fishing line. A ring such as 27 may also be used with this embodiment. The relative dimensions of the clasp 34 and the bore 15 should be the same as those described above with reference to clasp 22.

Figure 9:
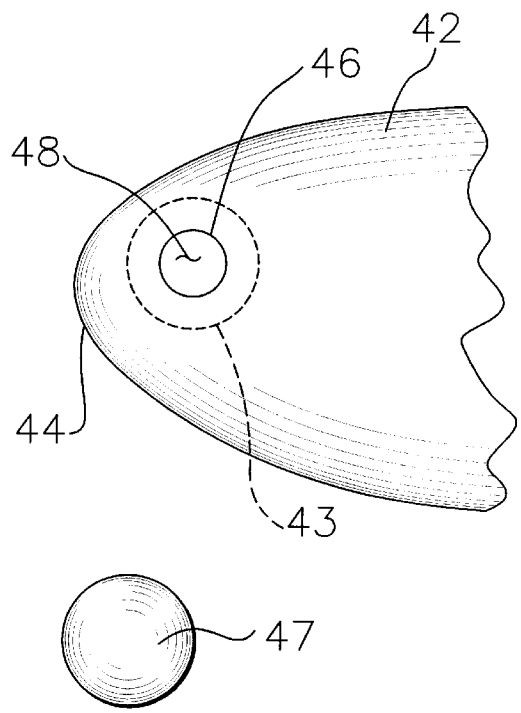
FIG. 9 is a partial side view of another embodiment of the invention.
Figure 10:
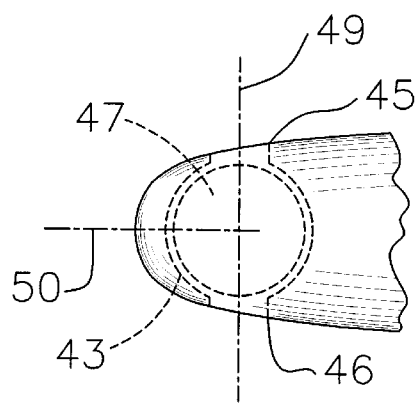
FIG. 10 is a partial top plan view of the embodiment of FIG. 9.

FIGS. 9 and 10 show another embodiment of the invention in which the soft lure body or body portion 42 has a spherical cavity 43 adjacent its leading end 44. A pair of coaxial circular holes 45 and 46 pass through the exterior surface of body portion 42 and communicate with cavity 43. The diameter of holes 45 and 46 is substantially smaller than the diameter of cavity 43. Either of the holes 45 or 46 can be stretched open sufficiently to permit a spherical weight or ball 47 to be pressed into cavity 43 within the lure body. The plastic body material around the hole then relaxes to approximately its original shape so as to releasably hold ball 47 inside of cavity 43 within body portion 42. The diameter of ball 47 may be the same as or slightly larger than that of cavity 43. Surfaces 48 of the ball 47 may be visible through holes 45 and 46, and such surfaces 48 may be decorated or colored so as to appear to be the eyes of the creature the fishing lure resembles. The central axis 49 of the holes 45 and 46 should be perpendicular to the longitudinal central axis 50 of the lure body portion. This embodiment may have a bore similar to bore 15 through body portion 42, and may use a connecting means for hook and line attachment that are essentially identical to those described above with reference to FIGS. 1–8.

Figure 11:
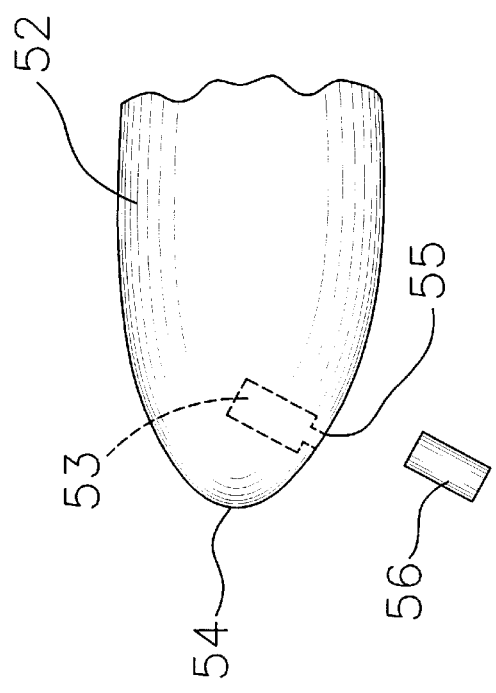
FIG. 11 is a partial side view of another embodiment of the invention.

FIG. 11 shows another embodiment of the invention in which the soft lure body or body portion 52 has a cavity 53 adjacent its leading end 54. A small circular hole 55 through the exterior of the body portion 52 communicates with cavity 53. Cavity 53 may be cylindrical in shape. The diameter of hole 55 should be substantially smaller than the diameter of cavity 53. The body material around hole 55 may be stretched to permit insertion of weight means into the cavity 53 within body portion 52, and the material around the hole may return to approximately its original configuration so as to releasably hold the weight means in the body portion in the manner described above with reference to FIGS. 9 and 10. The weight means may be a cylindrical rod segment 56. The diameter of rod segment 56 may be the same as or slightly larger than the diameter of cavity 53. In this embodiment the weight means or rod segment 56 may or may not be substantially hidden from view, depending on the size and location of hole 55. Body portion 52 may have a bore similar to bore 15 and may use a connecting means for hook and line attachment that is essentially identical to that described above with reference to FIGS. 1–8.

Figure 12:
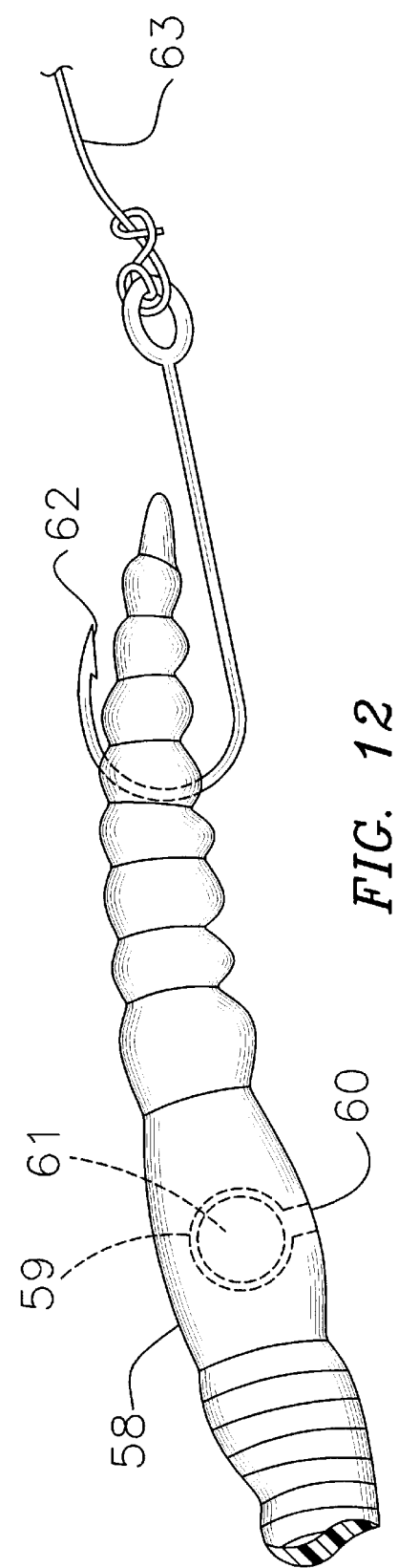
FIG. 12 is a partial side view of another embodiment of the invention.

FIG. 12 illustrates another embodiment in which a conventional plastic fishing lure such as worm 58 has an internal cavity 59 at some convenient location. A small hole 60 through the exterior of worm 58 communicates with cavity 59. The major dimension of hole 60 should be smaller than a major dimension of cavity 59. The plastic material around hole 60 can be stretched to permit insertion of a weight 61 into cavity 59 within the body portion of the worm 58, and then the plastic material around the hole will relax so as to releasably hold the weight 61 in the cavity. As shown in FIG. 12, the cavity 59 and weight 61 are both spherical and hole 60 is circular. However, the cavity, hole and weight may have any compatible shapes. The diameter, or other relevant dimension, of weight 61 may be the same as, or larger than, or smaller than the corresponding relevant dimension of the cavity 59, but such relevant dimension of the weight must always be larger than the size of hole 60. Weight 61 may or may not be visible, depending on the size and location of hole 60. Lure 58 may be rigged in any manner for attachment to a fish hook 62 and fishing line 63.

The weight means 10, 47, 56, and 61 may be made from any convenient material, but preferably will be a metal such as lead, stainless steel, aluminum, copper, or alloys of such metals. One of the advantages of this invention is that the action of a lure may be changed by changing the size and/or the material of the weight means inserted into the lure body cavity. For example, a fisherman may begin fishing with a lure as shown in FIG. 12 using a weight 61 made from aluminum. If the fisherman determines that the lure does not sink to a sufficient depth, the fisherman may stretch the plastic body material around the hole 60 and remove the weight from cavity 59. The aluminum weight can then be replaced with a similar weight made from lead, so the heavier weight will sink the lure to a greater depth. Similar results can be achieved by using smaller or larger weights made from the same metal. This change is lure depth or action achieved by changing weights does not require that the fisherman untie and retie the fish line connected to the lure.

The locating of the cavity holding the weight means on the central axis of a lure body adjacent the front or leading end of the lure, as shown in the embodiments of FIGS. 1–10, is necessary before a light-weight soft-bodied lure can automatically have the swimming or wobbling action characteristic of crank bait type fishing lures. In this central front end location, the weight means provides the soft bodied lures with sufficient mass that the remainder of the lure body can pivot back and forth against the weight means. This crank bait type of action permits unskilled fishermen to use soft bodied lures effectively because the action of the lure is not dependent on the skill and timing of the fisherman in the way the fisherman moves the fishing rod or reels in the lure. Fishing lures in accord with this invention are versatile enough that they can also be used by more skilled fishermen for other fishing methods, such as by jigging the lure up and down, by twitching the fishing rod tip, and by letting the lure slowly sink to a desired depth before reeling it in.

The lure bodies and body portions in accord with this invention should be made from a plastic material that is sufficiently soft that the lures feel lifelike to game fish. The plastic should be sufficiently flexible and resilient that the material defining the lure body portions around the holes 5, 45, 46, 55, and 60 can be stretched enough to permit insertion of the associated weights into the cavities 3, 43, 53 and 59. The relative size of such holes with respect to the largest dimension of the weight or portion of the weight that passes through the holes must be sufficient to prevent permanent deformation or tearing of the plastic lure body material around the holes. In a commercial embodiment of the invention that is essentially the same as that shown in FIGS. 1–7, the diameter of holes 5 and cavity 3 is ⅛ inch, the central portion 12 of weight 10 is 3/16 inch in diameter, and the largest diameter of knobs 11 is 5/16 inch. Most conventional natural or synthetic plastic formulations, such as those employing PVC (polyvinyl chloride) plasticized with esters such as phathalate, that are used to make soft plastic fishing lures are suitable for the practice of this invention. Such plastic formulations are commercially available from the Plastomeric Corporation.

Game fish attracting scent or taste may be added to the plastic material from which the lure bodies disclosed herein are made by mixing freeze dried fish and/or crawfish or other aquatic animal powder with the plastic formulation when the lures are being manufactured. When the scent or taste is used up or when the lure body is damaged or worn out, the fisherman can separate the weight and the connecting means and hook from the lure body. The lure body can then be discarded, and the weight and the connecting means and hook can be used again with an new lure body. This recycling of the weight and the connecting means reduces waste and lowers the cost of the lures. The ability to use the same weight and connecting means with different lure bodies also enables the fisherman to use the same weights and connecting means with lure bodies of different color, shape or size, and thus increases the variety of lures available at a relatively lower cost.

While the present invention has been described with reference to particular embodiments of artificial fishing lures and riggings, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A fishing lure comprising:
   A. a flexible resilient soft body having an exterior surface and a central axis, said soft body having a cavity therein, there being a pair of identical aligned holes of predetermined size through said exterior surface of said soft body communicating with said cavity at opposite ends of said cavity, said holes and said cavity having coaxial central axes, and said coaxial central axes of said holes and cavity being perpendicular to said central axis of said soft body;
   B. a weight having a dimension that is larger than said predetermined size of said holes;
   C. connecting means for attaching said fishing lure soft body to a fishing line; and
   D. said fishing lure soft body being sufficiently resilient and deformable such that said holes can be stretched so as to permit insertion of said weight through either of said holes into said cavity so that a portion of said soft body around such stretched hole can releasably hold at least a part of said weight in said cavity inside of the soft body of said fishing lure, and the resilience and deformability of said fishing lure soft body permitting removal of said weight through either of said holes for replacement with a different weight for altering the action of said fishing lure and for reusing said weight in another fishing lure soft body when said fishing lure soft body becomes damaged or worn out.

2. The fishing lure defined in claim 1, wherein a part of said weight remains outside of said cavity.

3. The fishing lure defined in claim 1, wherein said weight is one piece and shaped essentially like a dumbbell having enlarged heads at its opposite ends, and at least a part of each of said enlarged heads remains outside of said cavity and said holes so as to resemble eyes on opposite sides of said fishing lure.

4. The fishing lure defined in claim 1, wherein said weight is one piece and essentially spherically shaped, and spherical surfaces of the weight are visible through said holes so as to resemble eyes on opposite sides of said fishing lure.

5. The fishing lure defined in claim 1, further comprising said fishing lure soft body having upper and lower surfaces, a bore of predetermined size extending essentially vertically through said soft body and having entrance openings through said upper and lower surfaces, said connecting means passing through said bore, one end of said connecting means extending past said upper surface and an opposite end of said connecting means extending past said lower surface, means for connecting a fish hook to said opposite end, and said one end being adapted for connection to a fishing line.

6. The fishing lure defined in claim 5, wherein said connecting means has a dimension larger than said predetermined size of said bore, so that insertion of said connecting means through said bore stretches said soft body so as to grip and releasably hold said connecting means in said bore, said connecting means being removable from said bore for reuse in another fishing lure soft body when said fishing lure soft body becomes damaged or worn out.

7. The fishing lure defined in claim 5, further comprising means for preventing said connecting means from being pulled through said bore if said fishing lure soft body becomes snagged.

8. The fishing lure defined in claim 1, wherein said cavity is located adjacent the front end of said fishing lure soft body, and said weight has sufficient mass for said fishing lure soft body to pivot back and forth against such mass in a wobbling action.

9. A fishing lure comprising:
   A. a flexible resilient soft body having a front end, an exterior surface and a central axis, said soft body having a cavity therein, there being a hole of predetermined size through said exterior surface of said soft body communicating with said cavity, and said hole being on said central axis of said soft body;

B. a weight having a dimension that is larger than said predetermined size of said hole;

C. said fishing lure soft body being sufficiently resilient and deformable such that said hole can be stretched so as to permit insertion of said weight through said hole into said cavity so that a portion of said soft body around such stretched hole can releasably hold at least a part of said weight in said cavity inside of the soft body of said fishing lure, and the resilience and deformability of said fishing lure soft body permitting removal of said weight through said hole for replacement with a different weight for altering the action of said fishing lure and for reusing said weight in another fishing lure soft body when said fishing lure soft body becomes damaged or worn out;

D. connecting means for attaching said fishing lure soft body to a fishing line; and E. said cavity being located adjacent said front end of said fishing lure soft body between said connecting means and said front end, and said weight having sufficient mass for causing said fishing lure soft body to pivot back and forth against such mass in a wobbling action.

10. The fishing lure defined in claim 9, wherein a part of said weight remains outside of said cavity.

11. The fishing lure defined in claim 9, wherein said cavity passes completely through said soft body so as to define a pair of identical coaxial holes in said soft body aligned with each other at opposite ends of said cavity, said holes and said cavity having coaxial central axes, and said coaxial central axes being perpendicular to said central axis of said soft body of said fishing lure.

12. The fishing lure defined in claim 11, wherein said weight is one piece and shaped essentially like a dumbbell having enlarged heads at its opposite ends, and at least a part of each of said enlarged heads remains outside of said cavity and said holes so as to resemble eyes on opposite sides of said fishing lure.

13. The fishing lure defined in claim 11, wherein said weight is one piece and essentially spherically shaped, and spherical surfaces of the weight are visible through said holes so as to resemble eyes on opposite sides of said fishing lure.

14. The fishing lure defined in claim 9, further comprising said fishing lure soft body having upper and lower surfaces, a bore of predetermined size extending essentially vertically through said soft body and having entrance openings through said upper and lower surfaces, said connecting means passing through said bore, one end of said connecting means extending past said upper surface and an opposite end of said connecting means extending past said lower surface, means for connecting a fish hook to said opposite end, and said one end being adapted for connection to a fishing line.

15. The fishing lure defined in claim 14, wherein said connecting means has a dimension larger than said predetermined size of said bore, so that insertion of said connecting means through said bore stretches said soft body so as to grip and releasably hold said connecting means in said bore, said connecting means being removable from said bore for reuse in another fishing lure soft body when said fishing lure soft body becomes damaged or worn out.

16. The fishing lure defined in claim 15, wherein said connecting means comprises clasp means having closure means slidable there along for releasably holding said fish hook.

17. The fishing lure defined in claim 14, further comprising means for preventing said connecting means from being pulled through said bore if said fishing lure soft body becomes snagged.

18. A fishing lure comprising:

A. a flexible resilient soft body having a front end, upper and lower surfaces, an exterior surface and a central axis, said soft body having a cavity therein, there being a pair of identical aligned holes of predetermined size through said exterior surface of said soft body communicating with said cavity at opposite ends of said cavity, said holes and said cavity having coaxial central axes, said coaxial central axes being perpendicular to said central axis of said soft body of said fishing lure, and said cavity being on said central axis of said soft body;

B. a weight having a dimension that is larger than said predetermined size of said holes;

C. said fishing lure soft body being sufficiently resilient and deformable such that said holes can be stretched so as to permit insertion of said weight through either of said holes into said cavity so that a portion of said soft body around such stretched hole can releasably hold at least a part of said weight in said cavity inside of the soft body of said fishing lure, and the resilience and deformability of said fishing lure soft body permitting removal of said weight through either of said holes for replacement with a different weight for altering the action of said fishing lure and for reusing said weight in another fishing lure soft body when said fishing lure soft body becomes damaged or worn out;

D. there being a bore of predetermined size extending essentially vertically through said soft body and having entrance openings through said upper and lower surfaces of said soft body, connecting means passing through said bore, one end of said connecting means extending past said upper surface and an opposite end of said connecting means extending past said lower surface, means for connecting a fish hook to said opposite end, and said one end being adapted for connection to a fishing line, said connecting means having a dimension larger than said predetermined size of said bore, so that insertion of said connecting means through said bore stretches said soft body so as to grip and releasably hold said connecting means in said bore, and said connecting means being removable from said bore and also being reusable in another fishing lure soft body when said fishing lure soft body becomes damaged or worn out; and E. said cavity being located adjacent said front end of said fishing lure soft body between said one end of said connecting means and said front end, and said weight having sufficient mass for causing said fishing lure soft body to pivot back and forth against such mass in a wobbling action.

19. The fishing lure defined in claim 18, wherein said cavity is shaped essentially like a right circular cylinder and said holes are essentially circular in shape, and said weight is a rigid one piece unit shaped essentially like a dumbbell having enlarged heads at its opposite ends, and at least a part of each of said enlarged heads remains outside of said cavity and said circular holes so as to resemble eyes on opposite sides of said fishing lure.

20. The fishing lure defined in claim 18, wherein cavity is shaped essentially like a sphere and said holes are essentially circular in shape, and said weight is a rigid one piece unit and is essentially spherically shaped, and spherical surfaces of the weight are visible through said circular holes so as to resemble eyes on opposite sides of said fishing lure.

* * * * *